Inventors
HENRY F. HERBIG
LEON MEDLER
By [signature]
Attorney

Inventors
HENRY F. HERBIG
LEON MEDLER
By [signature]
Attorney

Inventors
HENRY F. HERBIG
LEON MEDLER
By [signature]
Attorney

PARTY LINE SUBSCRIBER IDENTIFIER

Filed Sept. 16, 1957 4 Sheets-Sheet 4

Inventors
HENRY F. HERBIG
LEON MEDLER
By [signature]
Attorney

United States Patent Office 3,073,905
Patented Jan. 15, 1963

3,073,905
PARTY LINE SUBSCRIBER IDENTIFIER

Henry F. Herbig, Smoke Rise, N.J., and Leon Medler, Bronx, N.Y., assignors to International Telephone and Telegraph Corporation, Nutley, N.J., a corporation of Maryland
Filed Sept. 16, 1957, Ser. No. 684,140
5 Claims. (Cl. 179—17)

This invention relates to telephone systems and more particularly to improvements in systems for identifying subscribers on party lines.

In the past there have been various arrangements suggested for identifying party line stations. For example, arrangements have been proposed to have the subscriber's party line station tested for identification by tone signals emanating from the central office when a call from such station has been initiated. In another arrangement the calling party dials an extra digit to identify his station when initiating a call, and other arrangements have been proposed to provide identification signals either upon the lifting of the subscriber's receiver or during a subsequent dial operation. Such arrangements, however, leave room for improvement either because, as in the first arrangement above, the amount of test equipment required at the central office is quite substantial; or because, as in the second arrangement above, the subscriber had to dial an extra digit and frequently dialed a wrong identifying digit. In the arrangement in which the identification of the station is obtained when the receiver is lifted, large amounts of equipment are entailed. In one such arrangement two frequency tones are assigned to identify each station and the station identifying tones are generated at the central office. In a copending application entitled "Party Line Identification System" by W. Hatton, Serial No. 451,791, filed August 24, 1954, there is disclosed one system to reduce the equipment by using only a single tone identification signal with an oscillator device producing the tone at each of the subscriber stations.

Collaterally with the problem of identifying a station there is the problem of reducing or eliminating the possibility of false identification. When dial contacts are broken or made there is a transient pulse passed along the telephone loop. FIG. 4 shows a series of graphs actually taken over a plurality of telephone loops. As shown in FIG. 4 for a loop of substantially zero miles, during the break of the dial contacts, there is a pulse of 38 volts maximum with a period of approximately 2.5 milliseconds. This transient pulse passing around the loop often gives rise to false identification by energizing certain relays in the system. This is especially true where frequency tones are used to identify the station. The other graphs in FIG. 4 show the pulses for greater distances or lines with greater amounts of resistance than a loop of zero miles. In addition to the transient pulses which are produced by the making and breaking of the dial contacts, there are erroneous frequency tones produced when the oscillator is started and before the oscillator reaches its steady state. These erroneous frequency tones, very often also give rise to a false identification and therefore present a second facet of this collateral problem.

The prior art as exemplified in the above-mentioned application uses a plurality of tone detector equipments at the central station with one each being assigned to a separate party line. Prior art arrangements also required the tone generators to be very precisely tuned to correspond with the equal spacing of the central frequencies of the signal channels. Further, the prior art arrangements failed to reduce the false identifications resulting from either the transient pulses or the erroneous frequency tones described above. It follows, that a telephone system which has a detector equipment which is used with more than one line, whose tone generators are not required to be precisely tuned, and which reduces false identification because of either transient pulses or erroneous frequency tones, is highly desirable.

Therefore, an object of this invention is to provide an improved telephone system having facilities for identifying subscriber stations on a party line or lines wherein the party line or lines may have a relatively large number of subscribers thereon.

Another object of the present invention is to provide a telephone system having facilities for reducing the possibility of false station identification because of either transient pulses or erroneous frequency tones.

Another object of the present invention is to provide an arrangement utilizing a relatively inexpensive signalling device at each substation, and in combination therewith a frequency sensing means at the central office, which arrangement is capable of dealing with a large frequency-drift tolerance which is inherent in inexpensive signalling generators and which is usually considered undesirable.

Another object of the present invention is the provision of a common identification sensing means for use with a plurality of party lines.

In accordance with a main feature of the present invention, there is provided circuitry means to render the identifying frequency sensing means to be operative only during a period when the dial contacts are open and during a period when the transient pulses that accompany a dialing operation and the changing frequency tones that accompany the starting of an oscillator operation, have had time to subside.

Another feature of the present invention provides for arranging the center frequencies of the identification signal channels substantially in a geometric progression within the audio frequency band to permit a frequency-drift for the respective tone generators, which is inherent with inexpensive tone generators, to be within the same percentage rating for each center frequency of each channel.

Another feature of the present invention is the provision of switching means to remove the identifying frequency sensing means from the line to be ready for use with another line after the calling station has been identified.

The foregoing and other objects and features of this invention and the manner of attaining them will become more apparent and the invention itself will be best understood by reference to the following description of the invention taken in conjunction with the accompanying drawings comprising FIGS. 1, 2, 3 and 4 wherein.

Figure 1:
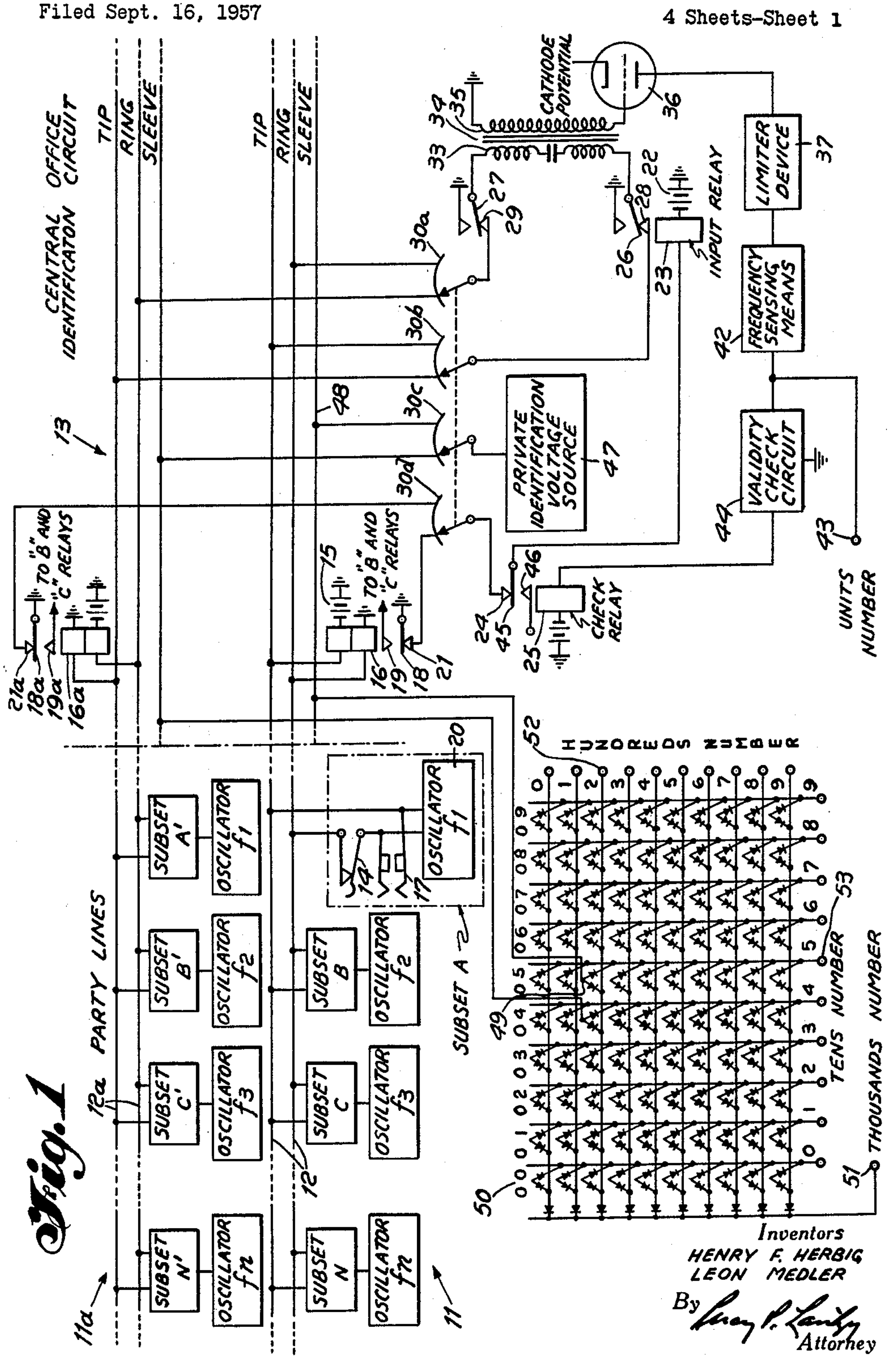
FIG. 1 is a schematic and block diagram of a section of a telephone system.

Referring particularly to FIG. 1 party line arrangements designated as 11 and 11a are respectively coupled over two pairs of telephone lines 12 and 12a to a central office 13. Each of party lines 12 and 12a has a plurality of similar subsets A, B, C through N and A', B', C' and N' connected thereto. While there are shown two party lines, obviously there could be and generally are more than two party lines. When the subscriber lifts his telephone receiver, of the subset A, the receiver control contacts 14 are closed. When the contacts 14 are closed the battery voltage from the battery 15 through relay 16 is impressed across the lines 12 by the circuit through the dial contacts 17, receiver control contacts 14 back to the other side of the relay 16. For purposes of this part of the description the dial contacts 17 are considered closed and the relay contact 18 considered transferred to the front (energized) contact 19, although they are shown respectively open and transferred to the back contacts 21 in FIG. 1 in accordance with the position of the other relays and the operation of the circuit as described hereinafter. The current flow, as in the above described circuit, energizes the relay 16 and transfers the movable contact 18 to its front contact 19. The contact 19 is coupled as shown to the "B" and "C" relays, which are supervisory relays and which are slow release relays. These relays ignore the energization and de-energization of relay 16 after once being energized. The function of the "B" and "C" relays is more fully explained on pages 421 and 422 of the text "The Design of Switching Circuitry" by Keister, Ritchie and Washburn, published by Van Nostrand, 1951. When the subscriber starts to dial, the dial contacts 17 are repeatedly opened and the oscillator 20, no longer being "shorted out," oscillates during each such open period. During the period of time when the dial contacts are open the oscillator 20 passes the frequency identification signal $f_1$ to the lines 12. Also during the period when the dial contacts are open the relay 16 is de-energized and the movable contact 18 is transferred to the back (de-energized) contact 21. Relay 16*a* with its contacts 18*a*, 19*a* and 21*a* is the counterpart of relay 16, but functions with line 12*a*. The return of the movable contact 18 to the back contact 21 does not mean that the "B" and "C" relays drop out since, as mentioned above, these relays are slow release relays and not controlled by relay 16. A circuit from the battery 22 through the relay 23 and back contact 24 of relay 25 on through contacts 21 to 18 to ground, causes the relay 23 to be energized and transfers the movable contacts 26 and 27 respectively to the front contacts 28 and 29.

Circuitry from the contacts 28 and 29 passes through the switching means 30*a* and 30*b*. The switching means 30*a* and 30*b* can be any of the well-known switching or line finding equipments of a central office found in the telephony art, such as those described in Chapter 16 of the text book by Keister, Ritchie and Washburn, mentioned above, or in the Brochure 2039, entitled "Selected Papers On Nationwide Toll Dialing and Automatic Toll Ticketing," published by the Automatic Electric Company, Chicago, Illinois, copyrighted 1954. Switching means 30*a* and 30*b* are shown mechanically coupled to two other switching devices 30*c* and 30*d*. These switching devices 30*c* and 30*d* are of the same type as 30*a* and 30*b*. These switches are shown mechanically coupled for purposes of illustration but need not be actually mechanically coupled, although the switches must operate in synchronism to find the same line, in order to switch the tone detector equipment, as soon as it is available, to a line which is seeking to be identified.

Figure 4:
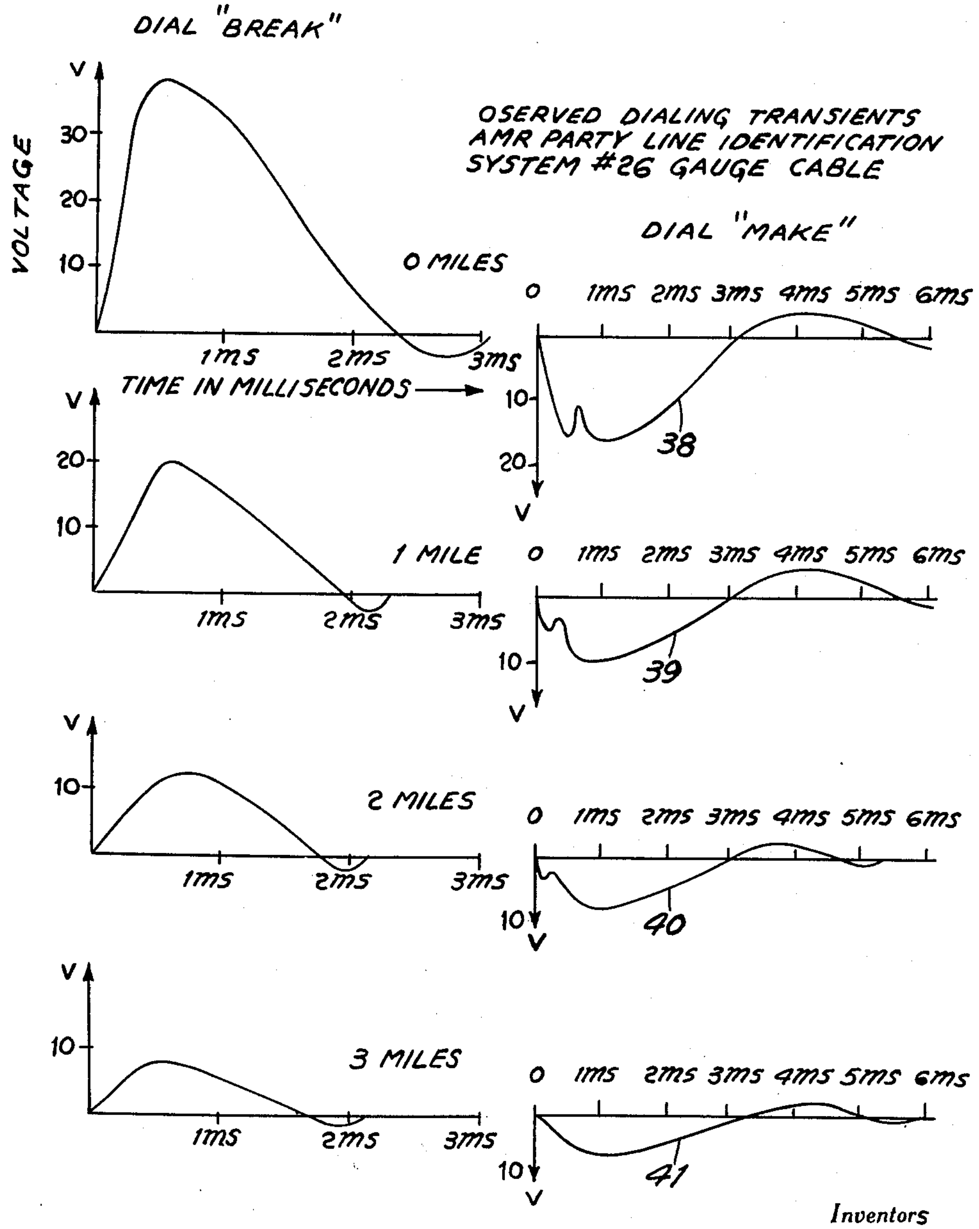
FIG. 4 is a series of graphs showing the amplitude of transient pulses measured in one series of tests, due to making and breaking dial contacts, for various telephone loops.

Energizing relays 23 through the back contacts of relay 16 when the dial contacts 17 are opened insures that the identification circuit will "hear" the identification tone, $f_1$ in the example cited above, only when the dial contacts are opened, which aids in eliminating false identification. The period of time to transfer movable contact 18 from the front contact 19 to the back contact 21 is preferably approximately 10 milliseconds. In a typical example, as shown in FIG. 4, the period for a transient pulse is 2.5 milliseconds and therefore the 10 milliseconds period is sufficiently long to permit the transient pulses which are produced with the opening of the dial contacts to subside. This 10 millisecond period also provides a sufficient period of time to allow the frequency generator or oscillator $f_1$ to reach its steady state thus blocking the erroneous frequency tones which occur when the oscillator starts oscillating, from being passed to the line. In order to acquire this 10 millisecond period an adjustable relay such as those described on page 17 of the text by Keister, Ritchie and Washburn mentioned above, can be used. In normal operations dial contacts are closed for approximately 37 milliseconds and opened for approximately 63 milliseconds. Since it takes 10 milliseconds to transfer the movable contact 18 to the back contact 21 there will remain 53 milliseconds for the system to "read" a dial pulse. The identification tone $f_1$ with relay 23 being energized, is passed to the primary side 33 of the transformer 34. The signal is amplified from the secondary 35 by the amplifier 36 and passed to a limiter device 37. The limiter device may be any well-known clipping circuit or electronic circuitry for establishing the maximum voltage of the signal received from the line. The transient pulses which occur when the dial contacts are closed obviously cannot be blocked by a relay transfer such as is done with the transient pulses that occur with the opening of the dial contacts, since the "make" transient pulses commence with the closing of the circuit. The limiter device acts to hold the amplitude of these transient pulses to the D.C. level occuring with the energization of relay 16. By holding the amplitude of these transient pulses to this level, the signals of the fundamental frequency of the transient pulse and its harmonics are of insufficient amplitude to effect a false identification by passing through the detecting circuit and energizing identification relays thereat. Such pulses can be seen on FIG. 4 by the graphs for the dial "make" with the respective pulses 38, 39, 40 and 41 for the four loops zero miles through three miles. The signal $f_1$ is passed from the limiter device 37 to the frequency sensing means 42 wherein it is translated into a number representing the units number of the subset "A" and passed to the output terminal 43. Simultaneously, from the frequency sensing means the identification of the subscriber, which is now in some coded form, is passed to the validity check circuit 44 and if it is there determined that the subscriber has been identified, the check relay 25 is energized. The validity check circuit 44 can be of the type described on page 428 of the text by Keister, Ritchie and Washburn mentioned above. It will be noted on page 428 of this text that the "2 out of 5" check circuit shows five relays with weighted values of 0, 1, 2, 4 and 7. These relays can be energized by circuits, including amplifiers, from the temporary storage tubes of FIG. 2 which are described hereinafter. When the check relay 25 is energized, the movable contact 45 transfers to the unenergized contact 46 and thus causes the relay 23 to be de-energized. With the relay 23 de-energized the movable contacts 26 and 27 return to their de-energized position and the identification circuit is removed from the line and made available by means of the switching means 30*a* and 30*b* for use with another subscriber on another party line such as 12*a*.

Figure 2:
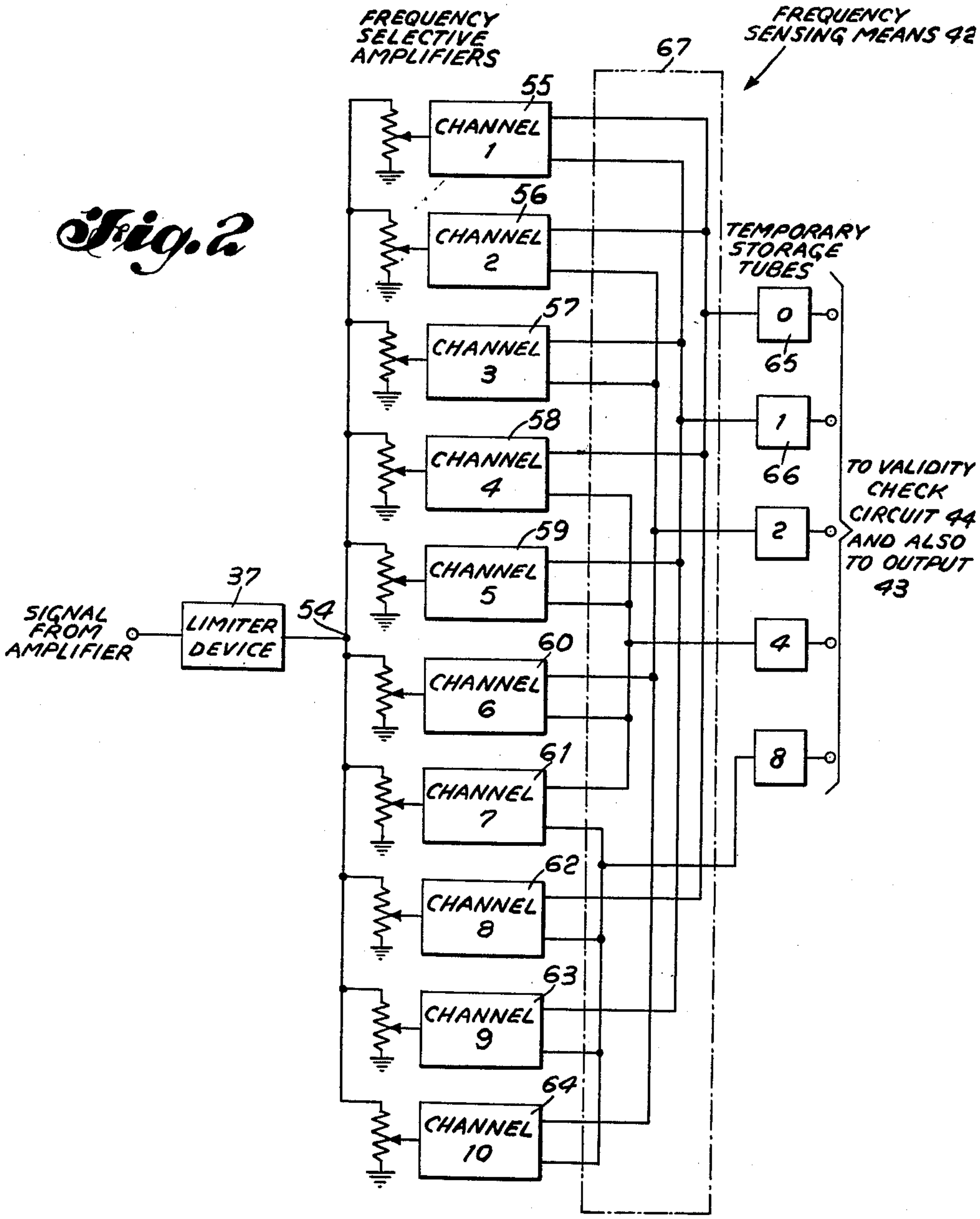
FIG. 2 is a more detailed block diagram of the frequency sensing apparatus shown in FIG. 1.

The frequency tone merely identifies the party on a party line and adds the units digit to the information which identifies the calling party or the subscriber's directory number. Other means are used to determine, for instance, the first three numbers of the subscriber set which is to be identified. Such other means are shown in FIG. 1. From the private identification voltage source 47 a voltage is impressed on a sleeve wire 48 through the switching means 30*c* which raises the potential at a matrix point, for example 49, of a matrix 50. The matrix 50 is a diode matrix to accommodate 100 stations. By raising the potential of point 49, it is clear from the matrix operation, that there will be an output at the thousands number terminal 51, the hundreds number 2 terminal identified as 52, and the tens number 5 terminal identified as 53. The thousands number is a pre-determined or pre-assigned number such as 2000 and there is an output from 51 resulting for any connection point similar to 49, on the matrix. If the pre-assigned thousand's number were 2, and the units number as determined by $f_1$ and appearing at the output 43 were the number 1 then the subscriber's number as seen in FIG. 2 would be 2251. This subscriber's number 2251 might either be the subscriber's directory number or a particular line number that could be translated into a directory number. The subscriber's number is passed from the matrix output and the frequency identification output to some utilization device, such as a data processing system for making up the subscriber's telephone bill.

FIG. 2 shows a more detailed drawing of the frequency sensing means. The limiter device from FIG. 1 is shown in FIG. 2 as 37. A signal from the limiter device 37 is passed to the parallel connecting point 54. In FIG. 2 there are shown a plurality of frequency selective amplifiers which include filter devices identified as 55 through 64. Each of these frequency selective amplifiers is responsive to a single different frequency channel which for the ten amplifier arrangement shown are $f_1$ through $f_{10}$. Although in the description hereinafter a filter will be said to be responsive to a frequency, for example $f_1$, in reality, the filter in accordance with the invention is responsive to a center frequency $f_1$ ±7.5%. Let us assume that the frequency selective amplifier 55 is responsive to $f_1$ and therefore the frequency identification signals $f_1$ pass through the amplifier device 55 to apply a signal to the storage tubes 65 and 66. It can be seen from FIG. 2 that the storage tube 65 which represents the zero in a binary counter is tied to channels 1, 2, 4, and 8 and the storage tube 66 which represents a weighted 1 in a binary counter is tied to the channels 1, 3, 5 and 9. This encoding circuitry 67, as shown, will route a signal passing through the frequency selective amplifier 55 to the storage tubes 65 and 66 to store thereat, temporarily, the binary information 01 and thus effect a translation from decimal information as represented by the channels 1 through 10 to binary coded information, as represented by the weighted storage tubes 0, 1, 2, 4 and 8. Ordinarily the weighted binary code 0, 1 2, 4 and 8 would require that three tubes, namely, weighted tubes 1, 2 and 4 be conditioned, to "read" the number 7. If there were three tubes conditioned, this would signify an error in a check circuit where a 2 out of 5 check is being used. Therefore the encoding matrix provides that the weighted tubes 4 and 8 be conditioned to read a number 7, but the system returns to normal operation having the weighted tubes 0 and 8 conditioned for reading the number 8. If for some reason there have been erroneous signals on the system giving a false identification, statistically speaking, it would be improbable that only two of the storage tubes would have information stored thereon. Making use of this statistical knowledge the system herein passes the information from the storage tubes to the validity check circuit shown as 44 in FIG. 1 whereat there is performed the well-known 2 out of 5 check. The validity check circuit 44 as mentioned above is described on page 428 of the text book by Keister, Ritchie and Washburn.

Figure 3:
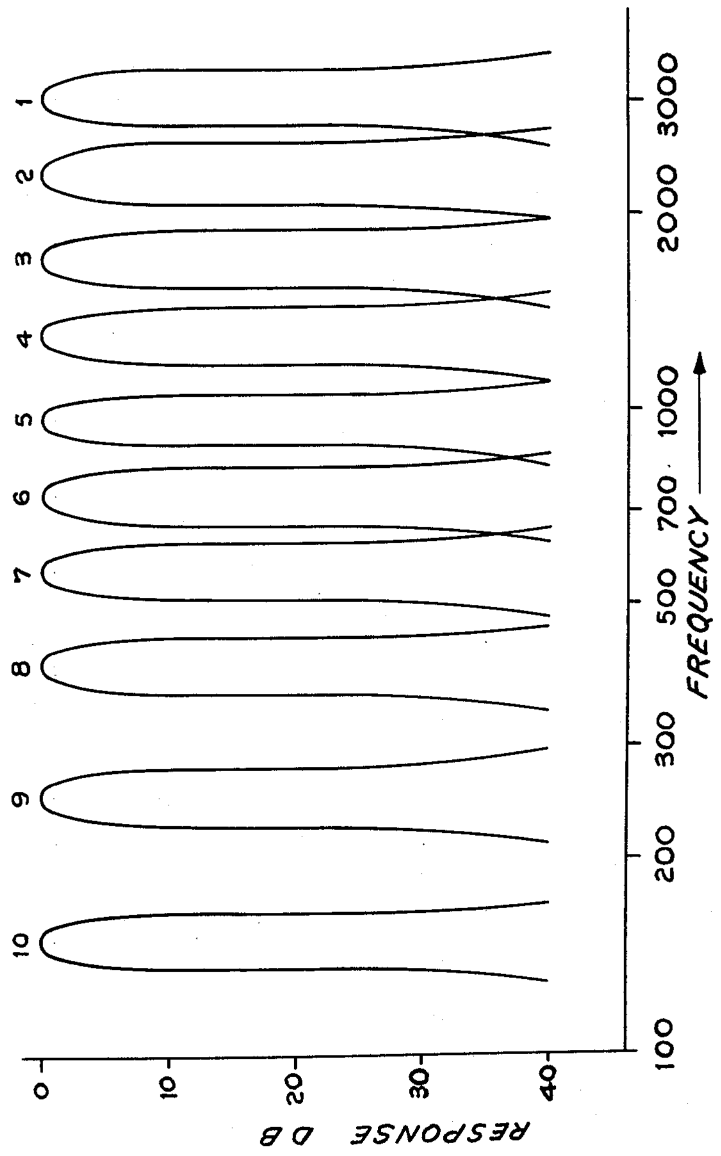
FIG. 3 is a series of graphs showing actual response characteristics obtained for a plurality of filters arranged in accordance with the present invention.

FIG. 3 shows a series of graphs taken for a group of filters such as the filters used in the selected amplifiers 55 through 64 shown in FIG. 2 and arranged according to one feature of the present invention. It will be noted in FIG. 3 that the center frequencies are arranged in substantially geometric progression. By arranging the center frequencies in this substantial geometric progression, the three db points for each channel represent $f_0$ ±7.5%. The rated frequencies of the respective oscillators each correspond with an associated channel center frequency and are arranged according to the same substantial geometric progression. The filters are chosen to have very steep skirts or guard band sides, as shown in FIG. 3, with the 10 db point representing $f_0$ ±10% and the 40 db point representing $f_0$ ±15%. By choosing the filters with the characteristics shown in FIG. 3 and arranging them as such, there is set up relatively large guard bands between the channels and the oscillators in the subscriber sets can be of the relative inexpensive variety wherein the manufacturing tolerances can be as great as $f_0$ ±4%. In FIG. 3 the graphs have been plotted on semi-logarithmic paper to show substantially equal spacing between the channels. It will be noted that the spacing between channels 10 and 9 as compared with the spacing between channels 8 through 1 is different. The geometric progression was not kept intact at channels 10 and 9 because channel 10 being at a low frequency had to be located between the second and third harmonic of the 60 cycle power. The location of channel 9 is somewhat arbitrary being determined by channel 10's location and being approximately half way between channel 9 and channel 10 as measured on a logarithmic scale. Since the overall identification circuit may cause the signals from the oscillators to drift another ±3.5%, in addition to the already permissible ±4%, the filters are designed to have the 3 db point at ±7.5%.

While we have described above the principles of our invention in connection with specific apparatus, it is to be clearly understood that this description is made only by way of example and not as a limitation to the scope of our invention as set forth in the objects thereof and in the accompanying claims.

We claim:

1. A telephone system comprising an exchange, a party line connected to said exchange, a party line subscriber station connected to said party line and having dial contacts, switch means at said station for directly connecting said dial contacts across said line, whereby successive opening of said dial contacts produces dial pulses on said line, an oscillator at said station directly connected across said dial contacts and arranged to oscillate at a predetermined frequency only when said contacts are open and connected across said line and said oscillator is thus directly connected to said line, frequency signal sensing means at said exchange tuned to said predetermined frequency, and means at said exchange coupled to said party line and responsive to each opening of said dial contacts when said dial contacts are directly connected to said line for connecting said frequency signal sensing means to said line, said connecting means having a delay in operating sufficient for said oscillator to produce a steady oscillation at each opening of said dial contacts and for the transient pulse incident to the opening of said dial contacts to dissipate before said frequency signal sensing means is connected to said party line.

2. A telephone system, as defined in claim 1, in which the means for connecting the frequency signal sensing means to the line comprises a slow-release relay, a set of contacts connected to said line and a set of contacts connected to said sensing means controlled by said relay, and means for de-energizing said relay when the dial contacts of a party line station are open and connected directly across said line, the release time of said relay being less than the time duration of a dial pulse.

3. A telephone system, as defined in claim 2, in which the sets of contacts controlled by the relay are the contacts of a second relay and means is provided to energize said second relay to close said contacts when said first-mentioned relay is de-energized.

4. A telephone system, as defined in claim 1, in which there are a plurality of subscriber stations connected to the party line, each with an oscillator, the oscillators having different center frequencies substantially arranged in a geometric progression, and in which the frequency signal sensing means has a flat response over a predetermined band width for each of said frequencies and a guard band of substantially negligible response between the frequency bands of said signals.

5. A telephone system comprising an exchange, a party line connected to said exchange, a plurality of subscriber stations connected to said party line each having dial contacts, switching means at each station for directly connecting said dial contacts across said line, whereby succession openings of said dial contacts will produce dial pulses on said line, an oscillator at each station, said oscillators having different center frequencies substantially arranged in a geometric progression, the oscillator at each station being directly connected across the dial contacts of that station and arranged to oscillate at its particular frequency when said dial contacts are open and connected across said line and said oscillator is thus directly connected to said line, frequency signal sensing means at said exchange for each oscillator tuned to the frequency of the associated oscillator and having a flat response over a predetermined bandwidth for each of said frequencies and a guard-band of substantially negligible response between the frequency bands of said signals, a coding matrix connected to said frequency signal sensing means for encoding signals passing from said sensing means, a validity check circuit coupled to said coding matrix for checking coded signals received from said coded matrix and for producing an output if said signal is not in accordance with a prescribed code, and means responsive to the output from said check circuit for causing the means for connecting said sensing means to the line to disconnect said sensing means from said line.

References Cited in the file of this patent

UNITED STATES PATENTS

| | | |
|---|---|---|
| 1,125,965 | Clark | Jan. 26, 1915 |
| 1,753,334 | Curley | Apr. 8, 1930 |
| 1,864,524 | Bragg | June 28, 1932 |
| 2,283,610 | Mohr | May 19, 1942 |
| 2,619,546 | Myers | Nov. 25, 1952 |
| 2,782,259 | Dimond | Feb. 19, 1957 |
| 2,794,859 | Abbott et al. | June 4, 1957 |
| 2,849,538 | Koehler | Aug. 26, 1958 |
| 2,929,880 | Koehler | Mar. 22, 1960 |
| 2,966,553 | Wadsworth | Dec. 27, 1960 |